Jan. 10, 1956 J. P. SEEK 2,729,843
WHEEL CARRIER FOR TANK TYPE VACUUM CLEANERS
Filed Jan. 8, 1953 2 Sheets-Sheet 1
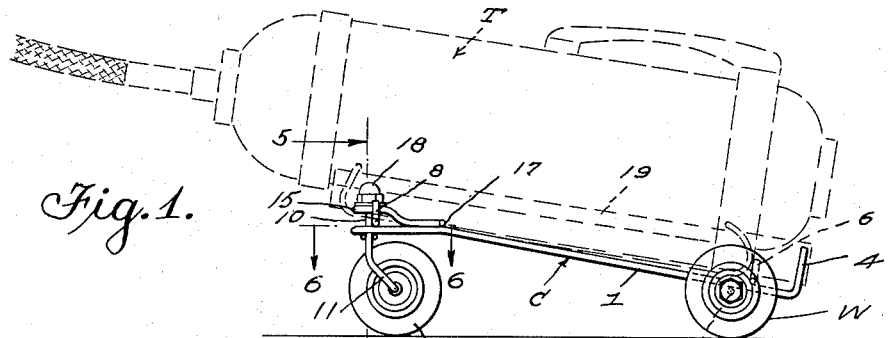
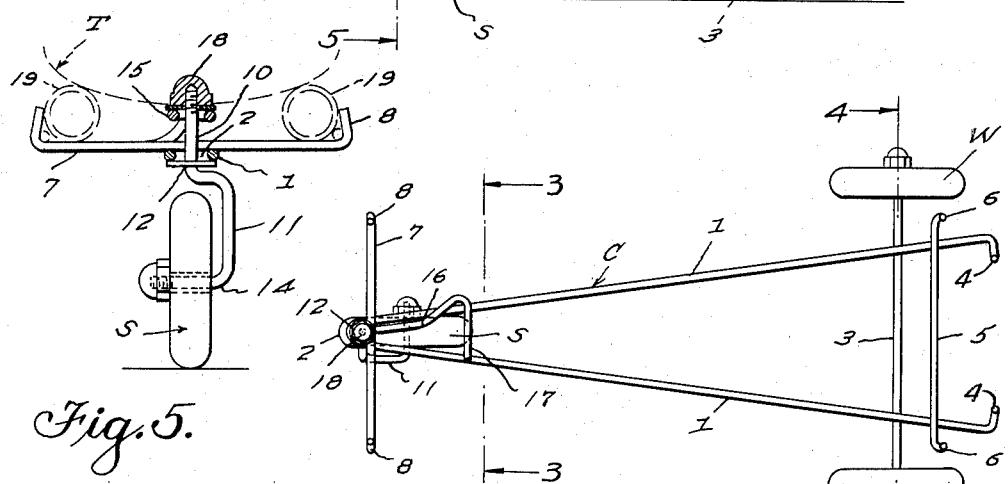
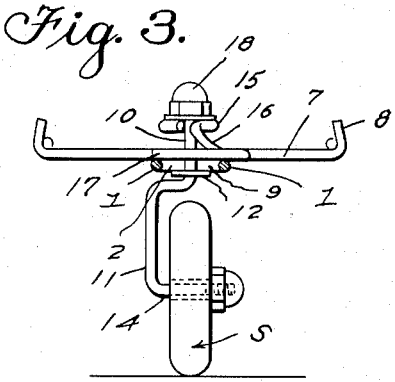
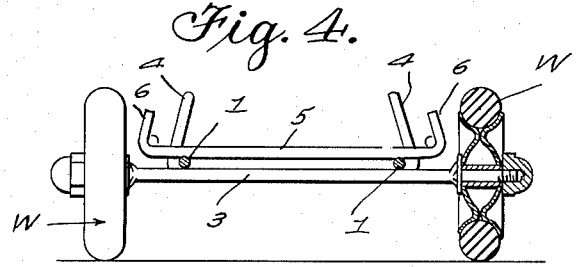
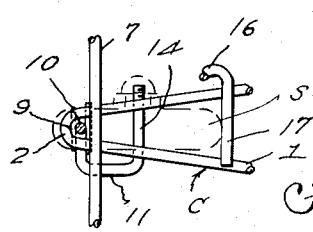
INVENTOR.
Joseph P. Seek.
BY
Wilfred E. Lousen
ATTORNEY.

Jan. 10, 1956  J. P. SEEK  2,729,843
WHEEL CARRIER FOR TANK TYPE VACUUM CLEANERS
Filed Jan. 8, 1953  2 Sheets-Sheet 2

Inventor
Joseph P. Seek
By Wilfred E. Lawson
ATTY

# United States Patent Office 2,729,843
Patented Jan. 10, 1956

2,729,843

WHEEL CARRIER FOR TANK TYPE VACUUM CLEANERS

Joseph P. Seek, Culver City, Calif.

Application January 8, 1953, Serial No. 330,219

4 Claims. (Cl. 15—257)

The invention relates to a cart and has relation more particularly to a vehicle of this kind especially designed for use in connection with a tank type of vacuum cleaner having runners and it is an object of the invention to provide a cart which can be conveniently employed for facilitating the use of the vacuum.

It is also an object of the invention to provide a cart having means wherein a vacuum cleaner of a tank type can be effectually yet releasably held thereon and which cart is of advantage in shifting the cleaner from one location to another as may be desired.

A further object of the invention is to provide a cart that is light in weight and which, when in use, offers no hindrance or interference to the use of the cleaner thereby making the cart desirable for use in the household.

The invention consists in the details of construction and in the combination and arrangement of the several parts of my improved cart whereby certain advantages are attained, as will be hereinafter more fully set forth.

In order that my invention may be better understood, I will now proceed to describe the same with reference to the accompanying drawings, wherein:

Figure 1 is a view in side elevation of a cart constructed in accordance with an embodiment of the invention, an associated vacuum cleaner being indicated by broken lines in position thereon;

Figure 2 is a view in top plan of the cart as herein comprised;

Figure 3 is a sectional view taken substantially on the line 3—3 of Figure 2;

Figure 4 is a sectional view taken substantially on the line 4—4 of Figure 2;

Figure 5 is a sectional view taken substantially on the line 5—5 of Figure 1, a portion of the associated cleaner being indicated by broken lines;

Figure 6 is a detail sectional view taken substantially on the line 6—6 of Figure 1.

Figure 7:
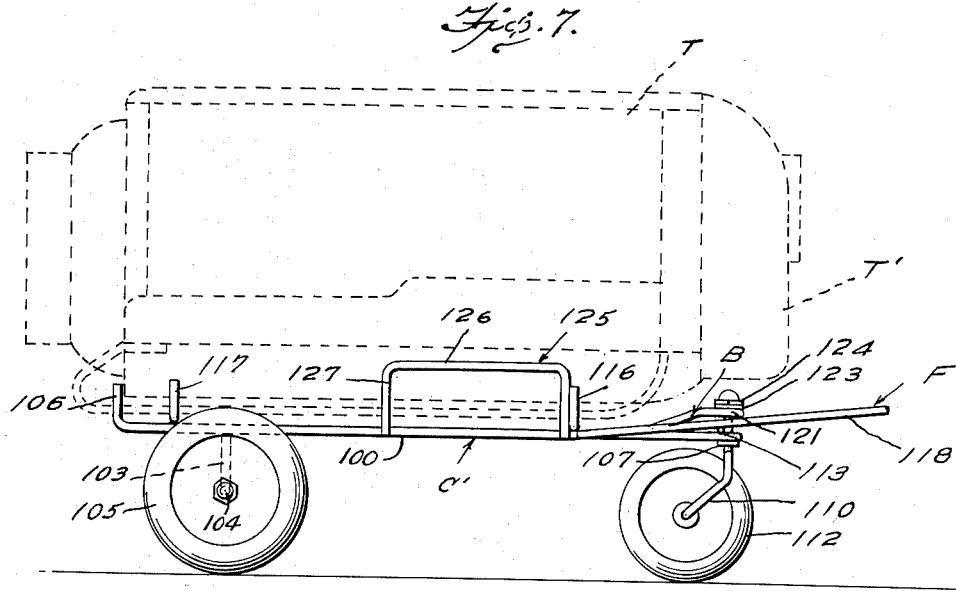
Figure 7 is a view in side elevation of a modified embodiment of the cart designed for the horizontal support of another form or embodiment of the vacuum cleaner structure.

In the embodiment of the invention as illustrated in the accompanying drawings, the chassis C of the cart comprises two elongated members 1 disposed rearwardly in divergence whereby the chassis C in top plan is in the form of an elongated V with the apex forwardly disposed and the free extremities of the members rearwardly directed.

The forward or apex extremities of the members 1 are connected by an outwardly disposed substantially semi-circular connecting member 2. The member 2 is herein shown as integral with the members thus allowing the chassis to be formed from a single length of material possessing requisite strength and rigidity.

Underlying the rear end portion of the members 1 and welded or otherwise fixedly secured thereto is the axle member 3 at right angles to the longitudinal axis of the chassis. This axle member 3 is substantially equidistantly disposed beyond opposite sides of the chassis C and mounted on said extended portions are the wheels W, preferably rubber tired.

The rear or free extremities of the members 1 of the chassis C are continued by the inwardly and upwardly disposed arms 4 possessing a certain degree of inherent resiliency. Resting from above on the members at points between the arms 4 and the axle 3 is a cross member 5 welded or otherwise rigidly held to the members 1. This cross member is substantially at right angles to the longitudinal axis of the chassis C and extends equi-distantly beyond opposite sides of the chassis C but terminating inwardly of the adjacent wheels W. The extremities of this cross member 5 are continued by the upwardly and inwardly disposed arms 6 possessing a certain amount of inherent resiliency.

Disposed transversely of the forward extremity of the chassis C and in close proximity to the connecting members 2 is a second cross arm 7 of a length substantially the same as the length of the member 5. This member 7 is substantially in parallelism with the member 5 and rests from above on the chassis C and is welded or otherwise fixedly held to the members 1. This member 7 also extends equi-distantly beyond the opposite sides of the chassis C and has its extremities continued by the upwardly and inwardly inclined arms 8.

The connecting member 2 and the adjacent posts of the members 1 and the adjacent central part of the member 7 combine to provide a front loop 9 through which freely extends from below a top shank 10 comprised in the front steering post 11. The shank 11 is laterally offset with respect to the post 11 and the lower extremity of the shank 10 carries a surrounding washer or enlargement 12 which has contact from below with the members 1 and 2 and thus provide a seat for said forward extremity of the chassis C.

The lower extremity of the post 11 is provided with a laterally disposed arm 14 which constitutes an axle upon which the tired front or steering wheel S is mounted.

The shank 10 is of a length to extend a material distance above the chassis C and freely through an eye member 15 carried by the outer extremity of a resilient arm 16. The extremity of the arm 16 remote from the eye member 15 is continued by a lateral extension 17 which extends across the chassis C at a point slightly to the rear of the cross member 7 and rests upon the members 1 to which it is welded or otherwise fixedly secured. The eye member 15 through the action of the arm 16 constantly bears from below against a head member 18 threaded or otherwise detachably engaged with the upper or outer end portion of the shank 10 and thus yieldingly maintained the forward extremity of the chassis C seated upon the enlargement or washer 12 but allowing requisite free turning of the shank 10 as it is desired to change the course of travel of the cart.

As is clearly shown in Figure 1 of the drawings, the post 11 supports the front end of the chassis C higher than the rear portion and the forward portion of the chassis is on an angle with respect to the rear portion and on such a degree of angle to have the forward portion of the chassis C substantially parallel to the surface upon which the wheels W and S rest upon. The forward portion of the chassis C is relatively short as to length and the portion of the chassis C rearwardly thereof extends a major distance of the length of the chassis C. Each of these angularly front and rear portions of the chassis is each substantially straight in side elevation to assure effective mounting on the chassis the tank of a vacuum tank type of cleaner which carries the runners 19.

When the tank T is placed upon the chassis, the arms 4, 6 and 8 have such engagement with the runners 19 to effectively hold the tank T upon the chassis C.

Figures 7 to 10 inclusive illustrate another embodiment of the cart structure which is designed for supporting a tank type vacuum cleaner of a later model than the one illustrated in dotted lines in Figure 1.

In this modified construction the cart chassis is designated C' and comprises the elongate rail members 100 which are disposed in forwardly convergent relation and are joined together at the front end of the cart at 101. These rail members may be initially individual elements joined joined together or they may comprise a single long bar bent intermediate its ends into the substantially V-form illustrated in Figure 8.

The numeral 102 designates a rear axle which is joined at the two ends to the short vertical legs 103, each of which terminates in the lateral extension 104. Upon each of these extensions is rotatably mounted a rear wheel 105.

Each of the side rails 100 terminates in the upwardly and inwardly extending rear end holding finger 106, while at the forward end the convergent rails 100 have secured to the underside thereof, the disc 107 which is centrally apertured to receive the vertical pivot post 108.

The lower end of this post extends laterally as indicated at 109 and this lateral extension is joined to the downwardly and rearwardly extending axle arm 110 which terminates in the laterally extending and horizontally disposed axle portion 111 upon which is rotatably mounted the wheel 112.

It will be seen that this axle post and wheel, which are on the longitudinal center of the cart, form a caster wheel which facilitates the ready movement of the cart over a floor or other supporting surface.

While the caster wheel 112 is positioned beneath the rails 100 and is of smaller diameter than the back wheels 105, the chassis frame is maintained horizontal by the provision of the U-shaped rear axle structure which provides the elevated central part 102 with the lower positioned terminal portions 104 upon which the wheels are mounted.

At the forward end of the chassis there is disposed across and secured upon the top of the rails 100 the transverse bar 113, while at a location rearwardly of this transverse bar there is disposed the transverse bolster bar 114 which is parallel with the bar 113 and at the rear end of the chassis there is a corresponding transverse or rear bolster bar 115.

The bar 114 has the upturned or vertically disposed stakes 116 while the rear bolster bar 115 has corresponding upstanding stakes or holding members 117 for the purpose about to be described.

Figure 8:
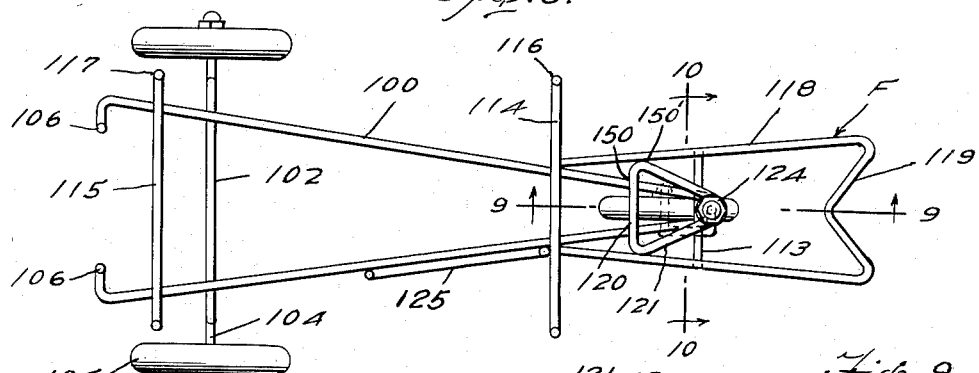
Figure 8 is a view in top plan of the cart shown in Figure 7.

At the forward end of the chassis there is positioned the forwardly and upwardly projecting or inclined door supporting frame which is generally designated F. This frame comprises preferably a single length of rod-like material which is shaped to provide the two rearwardly converging side members 118 and the transverse forward end V-shaped connecting portion 119 which is pointed or directed rearwardly as shown in Figure 8. In other words, the open side of the V is directed forwardly. The frame F is positioned to have the side members 118 resting across the top and upon the ends of the transverse bar 113 while the rear ends of the members 118 are secured to the side rails 100 beneath the front or forward bolster bar 114 as illustrated. The side members 118 are also slightly rearwardly convergent so that the frame F is wider at its front than at the rear and the front end or cross portion 119 of the frame is positioned a substantial distance ahead of the caster wheel post 108.

Figures 9, 10:
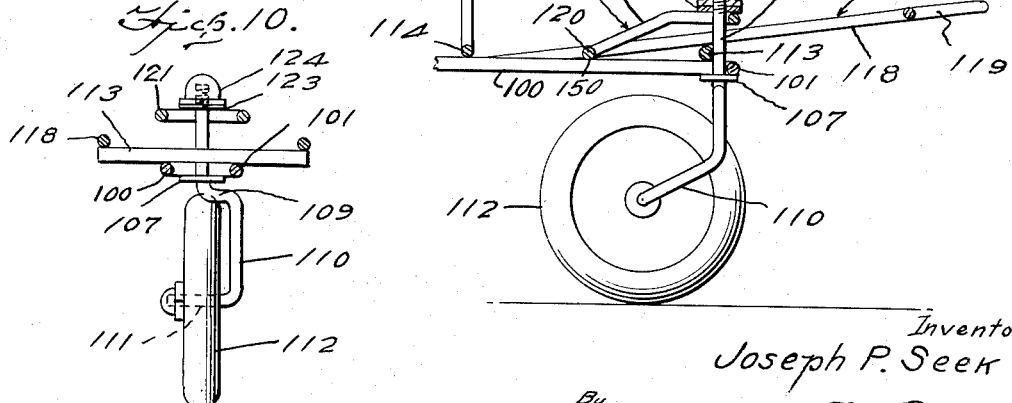
Figure 9 is a longitudinal section taken substantially on the line 9—9 of Figure 8.
Figure 10 is a transverse section taken substantially on the line 10—10 of Figure 8.

The upper end of the caster wheel post 108 is braced or steadied by the triangular brace frame which is generally designated B and which has its base bar 120 disposed across the top of and secured to the forward ends of the rails 100, while the side bars 121 extend upwardly and forwardly and connect around or are joined at the forward side of the caster wheel post 108 as shown in Figure 9, and support and have secured thereto a washer 123 through which the upper end of the post 108 passes, the upper end of the post having secured thereon the nut 124.

In addition to the fact that the base bar portion 120 of the triangular brace frame B is secured to the tops of the rails 100, as at 150, the outer ends of this bar portion 120 are secured, as at 150', to the adjacent bar members 118 of the forwardly extending door supporting frame F.

On the right hand side of the chassis frame C' the rail 100 has secured thereto the upstanding fence which is generally designated 125 and comprises the elongate top portion 126 which is substantially horizontal and the downwardly extending vertical legs 127 which are welded to the outer side of the adjacent rail 100.

The cart disclosed in Figures 7 to 10 inclusive is designed to take a vacuum cleaner of the tank type, of a slightly different form or construction from that shown in Figure 1. In this latter form, which is shown in outline in Figure 7 and generally designated T, there is a forward end or front door at the position designated T' and when the tank is in position upon the chassis frame it will be held by the upright side stakes 116 and 117 of the bolsters 114 and 115 upon which it rests and also by the upstanding rear holding fingers 106 and when the front end door is lowered the frame F will function as a support therefor.

The fence 125 engages in the spare wrapper compartment and thus it will be seen that the cleaner tank will be firmly supported upon the cart and by reason of the raised rear axle construction the cleaner will be maintained substantially level or horizontal.

From the foregoing it will be seen that there is provided by the present invention in its two forms or embodiments, a relatively simple but very useful carrying cart for a vacuum cleaner of the type illustrated and described and due to the novel manner in which the cart is constructed it will be seen that it can be made strong and durable while at the same time light so that it can be easily handled both for maneuvering the cleaner structure while it is in use and for lifting and transporting when the vacuum cleaner tank is removed.

I claim:

1. In a cart of the class described, a chassis comprising a pair of elongate rearwardly divergent members integrally connected at the forward ends thereof, inwardly inclined arms formed by bent portions of the rear ends of said members to engage a load placed upon the chassis, a cross member carried by said members in forwardly spaced relation with respect to said arms, other inwardly inclined arms formed by bent end portions of said cross member, a second cross member also carried by said members in rearwardly spaced relation with respect to the forward connected ends thereof, still other inwardly inclined arms formed by bent end portions of said second cross member, the arms of the first and second cross members being adapted to engage with the opposite sides of the load, said second cross member co-acting with the connected ends of said divergent members to provide a loop, a steering post having a shank extending upwardly through said loop, a head on said shank above the loop, a spring arm carried by the chassis and having an eye member through which said shank also extends, said spring arm urging said eye member into engagement with said head to normally maintain the shank at the limit of upward movement, an annular element carried by said shank in contacting relation with the under side of said loop to limit the upward movement of said post, a traction member carried by said post, and other traction elements supporting the rear end portion of the chassis.

2. In a cart of the class described, a chassis comprising a V-shaped frame having side members converging in the forward direction and integrally connected at the forward ends thereof, inwardly inclined arms upturned from the rear ends of said members, a cross element transversely of said members forwardly from said arms, other inwardly inclined arms upturned from the ends of said cross element beyond the outer sides of the members, an axle also extending transversely of said members forwardly from said cross element and having supporting wheels on its outer ends, a second cross element extending transversely of said members adjacent the forward ends thereof, inwardly inclined arms upturned from the ends of said second cross element and aligned with the said other arms, a wheel supported steering post having an upper end portion projecting upwardly through the connected end portions of said members, means on the upper end portion of said post supporting the forward end of the frame to allow for turning movements of the post and its supporting wheel relatively to the frame, and other means carried by the said upper end portion of said post to retain the same engaged with the frame, said arms being engageable with the runners of a vacuum cleaner tank to hold the tank in place during a cleaning operation.

3. The invention according to claim 2, with the said steering post below the frame formed to provide a laterally offset U-shaped portion having the upper and lower legs thereof horizontally disposed and the lower leg made longer than the upper leg, a caster wheel rotatably supported on said lower leg, and an elongate frame projecting forwardly of the front end of the chassis from points of securement to said side members of the first frame.

4. The invention according to claim 3, with an inverted elongate U-shaped element rising from one of the said side members intermediate the ends thereof.

References Cited in the file of this patent

UNITED STATES PATENTS

| | | |
|---|---|---|
| D. 145,564 | Doyle | Sept. 10, 1946 |
| 1,175,312 | Simpson | Mar. 14, 1916 |
| 1,183,362 | Fair | May 16, 1916 |
| 1,709,925 | Van Duzer | Apr. 23, 1929 |
| 1,901,878 | Schwenk | Mar. 21, 1933 |
| 2,177,153 | Ross et al. | Oct. 24, 1939 |
| 2,578,793 | Fujita | Dec. 18, 1951 |
| 2,690,341 | Fujita | Sept. 28, 1954 |

FOREIGN PATENTS

| | | |
|---|---|---|
| 101,618 | Sweden | May 20, 1941 |